(12) United States Patent
Koike-Akino et al.

(10) Patent No.: US 9,097,852 B2
(45) Date of Patent: Aug. 4, 2015

(54) MULTI-MODE INTERFERENCE DEVICE

(71) Applicants: Mitsubishi Electric Research Laboratories, Inc., Cambridge, MA (US); Mitsubishi Electric Corporation, Tokyo (JP)

(72) Inventors: Toshiaki Koike-Akino, Malden, MA (US); Keisuke Kojima, Weston, MA (US); Bingnan Wang, Belmont, MA (US); Satoshi Nishikawa, Tokyo (JP); Eiji Yagyu, Tokyo (JP)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 0 days.

(21) Appl. No.: 14/331,555

(22) Filed: Jul. 15, 2014

(65) Prior Publication Data

US 2014/0321823 A1    Oct. 30, 2014

Related U.S. Application Data

(63) Continuation-in-part of application No. 13/832,620, filed on Mar. 15, 2013.

(51) Int. Cl.
*G02B 6/28*    (2006.01)
*G02B 6/293*   (2006.01)
*G02B 6/12*    (2006.01)

(52) U.S. Cl.
CPC .......... *G02B 6/2813* (2013.01); *G02B 6/12007* (2013.01); *G02B 6/29344* (2013.01); *G02B 2006/12176* (2013.01); *G02B 2006/12178* (2013.01)

(58) Field of Classification Search
CPC .......................... G02B 6/2813; G02B 6/29344
See application file for complete search history.

(56) References Cited

U.S. PATENT DOCUMENTS

| | | | |
|---|---|---|---|
| 6,549,696 B1 * | 4/2003 | Uetsuka et al. | 385/24 |
| 6,571,038 B1 * | 5/2003 | Joyner et al. | 385/40 |
| 6,788,863 B2 * | 9/2004 | Parker et al. | 385/122 |
| 6,792,172 B1 | 9/2004 | Levy et al. | |
| 7,155,088 B2 * | 12/2006 | Thapliya et al. | 385/28 |
| 7,184,207 B1 * | 2/2007 | Walker et al. | 359/344 |
| 7,343,070 B2 | 3/2008 | Van Der Vliet et al. | |
| 7,349,628 B2 | 3/2008 | Augustsson | |
| 2002/0159696 A1 * | 10/2002 | Yamauchi et al. | 385/37 |
| 2003/0026544 A1 * | 2/2003 | Lin | 385/39 |
| 2008/0260322 A1 * | 10/2008 | Thapliya et al. | 385/9 |
| 2013/0136389 A1 * | 5/2013 | Luo et al. | 385/11 |

OTHER PUBLICATIONS

Jiao et al. "Systematic Photonic Crystal Device Design: Global and Local Optimization and Sensitivity Analysis." IEEE Journal of Quantum Electronics, vol. 42. No. 3. p. 266-279/ Mar. 2006.

Yao et al. "An Ultracompact Multimode Intergerence Wavelength Splitter Employing Asymmetrical Multi-Section Structures." Optics Express, vol. 20, No. 16, Jul. 30, 2012.

* cited by examiner

*Primary Examiner* — Michelle R Connelly

(74) *Attorney, Agent, or Firm* — Dirk Brinkman; Gene Vinokur

(57) ABSTRACT

A multi-mode interference (MMI) device includes a substrate layer, a core layer grown on the substrate layer for propagating an optical signal, and a cladding layer grown on the core layer for guiding the optical signal. The MMI device includes a patch with a non-uniform shape formed by an intersection of a plurality of curves forming a non-uniform refractive index distribution within the MMI device. The plurality of curves includes at least one curve with a non-null curvature.

19 Claims, 13 Drawing Sheets

100

200

500

700

800

900

MULTI-MODE INTERFERENCE DEVICE

RELATED APPLICATIONS

This application is a continuation-in-part of U.S. patent application Ser. No. 13/832,620 submitted by Kojima et al. on Mar. 15, 2013 for "Multi-Mode Interference Device," incorporated herein by reference.

FIELD OF THE INVENTION

This invention relates generally to optical devices, and more particularly to multi-mode interference (MMI) devices for propagating and manipulating an optical signal.

BACKGROUND OF THE INVENTION

In optical communications, wavelengths and polarizations of optical signals can be multiplexed in an optical carrier. Telecommunication networks are increasingly focusing on flexibility and configurability, which require enhanced functionality of photonic integrated circuits (PICs) for optical communications, as well as compact devices. Optical devices based on multi-mode interference (MMI) have large bandwidth, polarization insensitivity, and high fabrication tolerances.

For a number of applications, it is desired to minimize a length of the MMI device manipulating the optical signal. For example, in one MMI device, an indium gallium arsenide phosphide (InGaAsP) core, such as $In_{1-x}Ga_xAs_yP_{1-3}$ (compsition y=0.4), is arranged between an indium phosphide (InP) substrate and upper cladding.

The optical signal is concentrated in the core because the core has a high refractive index. The clading, which has a relatively low refractive index, guides the optical signal along a depth of the device. The length L of the MMI device requires a sequential number of repetitions of the beat length for the low and high wavelengths. The beat length is the length required for the polarization to rotate 360 degrees.

For example, $$L = M \times L_\pi^{\lambda_1} = (M+1) \times L_\pi^{\lambda_2}, \qquad (1)$$

where $L_\pi^{\lambda_1}$ and $L_\pi^{\lambda_2}$ are the beat lengths at wavelengths $\lambda_1$ and $\lambda_2$, respectively, and M is an integer. For an MMI device of a width W at wavelength $\lambda$, $L_\lambda \propto W^2/\lambda$, the length L is longer than 5 mm for a typical 1.27/1.29 μm wavelength splitter with W=8 μm.

However, the wavelength separation for 40/100 G Ethernet is typically 20 nm or smaller. It is a challenging to combine and separate optical signals oscillating with similar wavelengths in a small device.

For example, one MMI-based wavelength splitter/combiner is described in Yao et al., Optics Express 20 p. 18248, (2012). However, for operation of that device, wavelength separation has to be very large (such as 1.3 um and 1.55 um). Another optical manipulator is described by Jiao et al., IEEE J. Quantum Electronics, Vol. 42, No. 3, p. 266 (2006). However, a method used by that manipulator only applies to photonic crystal, and such manipulators are difficult to manufacture. Another method, described in U.S. Pat. No. 7,349,628, multiplexes or demultiplexes optical signals using an external control signal, which is not appropriate for some applications.

There is a need to manipulate optical signals with multiple wavelengths or polarizations while reducing the length and complexity of fabrication of an optical device.

SUMMARY OF THE INVENTION

Various embodiments of the invention are based on a realization that optical signals of different wavelength or polarization are affected differently by a change in a step of a refractive index in an optical device. The response of the signals to a single step of the refractive index is typically insufficient to provide a desired manipulation of the signals, such as combining or splitting the signals of different wavelengths. Multiple refractive index steps can collectively achieve the desired effect.

Accordingly, some embodiments of the invention manipulate the optical signals using multi-mode interference (MMI), with a non-uniform refractive index distribution within the MMI device. Usually, the non-uniform refractive index distribution is selected for a specific task, such as combining or splitting the signals having predetermined wavelengths. Some embodiments use an optimization technique to determine the non-uniform refractive index distribution for a specific task, for example combining multiple wavelengths.

The MMI devices according to various embodiments of the invention include patches arranged in a non-uniform, i.e., irregular, pattern in the MMI device. In contrast to a uniform pattern, the patches in a non-uniform pattern are not evenly spaced. Each patch forms a step of refraction index, such that the non-uniform pattern of patches causes the non-uniform refractive index distribution within the MMI device. In one embodiment, the patches have different dimensions, but identical shape, e.g., a rectangular shape, and thickness. Additionally, the patches can be arranged at an identical depth in the MMI device, and formed by a material with the same refractive index. In alternative embodiments, the patches vary in pattern, spacing shape, size, material, thickness, or depth.

Some embodiments of the invention are based on another realization that in addition or instead of using a non-uniform pattern of patches, a reduced number of patches with non-uniform shapes can be used to provide a non-uniform refractive index distribution in the MMI device. As used herein, the non-uniform shape of the patches is formed by a combination of different types of geometric primitives. For example, the non-uniform shape can be formed by an intersection of a plurality of curves including at least one curve with a non-null curvature. In different embodiments, the intersecting curves can have different curvatures and/or types. Generally, the plurality of curves includes a pair of curves intersecting at non-straight angle. In some cases, the non-uniform shapes can simplify the fabrication of the MMI device, and/or further reduce its length.

Accordingly, one embodiment discloses a multi-mode interference (MMI) device including a substrate layer; a core layer arranged on the substrate layer for propagating an optical signal; and a cladding layer arranged on the core layer for guiding the optical signal, wherein the MMI device includes a patch with a non-uniform shape formed by an intersection of a plurality of curves forming a non-uniform refractive index distribution within the MMI device, wherein the plurality of curves includes at least one curve with a non-null curvature.

Another embodiment discloses a method for manipulating an optical signal according to a predetermined task by a multi-mode interference (MMI) device. The method includes determining a non-uniform pattern of patches forming a non-uniform refractive index distribution within the MMI device, such that the non-uniform pattern of patches manipulates the optical signal according to the predetermined task, wherein the non-uniform pattern of patches includes a patch with a non-uniform shape formed by intersection of a plurality of curves, wherein at least two curves in the plurality of curves have different curvatures; and fabricating the MMI device having the non-uniform pattern of patches.

DETAILED DESCRIPTION OF THE PREFERRED EMBODIMENT

Figure 1:
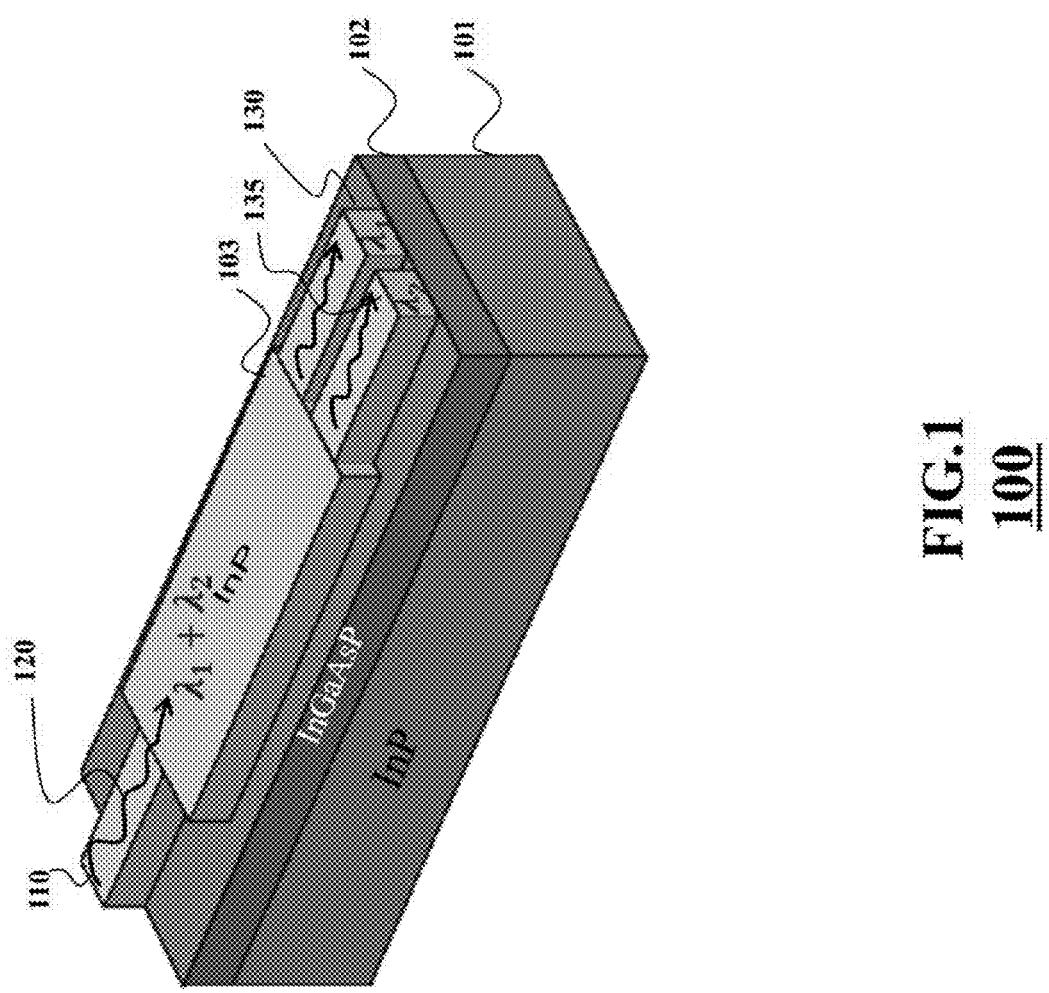
FIG. 1 is an isometric view of an exemplar multi-mode interference (MMI) device in accordance with one embodiment of the invention.

FIG. 1 shows an isometric view of an exemplar multi-mode interference (MMI) device 100 manipulating the optical signal according to a predetermined task in accordance with one embodiment of the invention.

The MMI device can be implemented as an epitaxial-grown structure having layers of a substrate, a core and a cladding, as described below. For example, in one embodiment, the MMI device is an indium phosphide (InP)/indium gallium arsenide phosphide (InGaAsP) structure, which includes an InP substrate, an InGaAsP core layer with As composition of, e.g., 60% lattice matched to InP, and InP cladding layer. In another embodiment, the MMI device can include a gallium arsenide (GaAs)/aluminum gallium arsenide (AlGaAs). Other variations are possible and within the scope of the embodiments of the invention.

For example, the MMI device 100 includes a substrate layer, e.g., an InP layer 101, a core layer, e.g., an InGaAsP layer 102, grown on the substrate layer for propagating an optical signal, and a cladding layer, e.g., an InP layer 103, grown on the core layer for guiding the optical signal.

The MMI device 100 includes an input waveguide 110 for inputting an optical signal 120 and output waveguides 130 and 135 for outputting two signals. In one embodiment, the optical signal includes two signals of different wavelengths. For example, the optical signal includes the first signal with the first wavelength $\lambda_1$ and the second signal with the second wavelength $\lambda_2$. In this embodiment, the predetermined task includes splitting the optical signal into the first signal and the second signal.

The predetermined task varies among embodiments. For example, in one embodiment, the predetermined task includes combining multiple signals into one signal. In another embodiment, the predetermined task includes combining or splitting multiple signals based on polarization of the signals. Also, in various embodiments, the wavelength and/or polarization of the signals can vary.

Various embodiments of an invention are based on a realization that signals of different wavelength or polarization are affected differently by a change, e.g., a step, of a refractive index in an optical manipulator. The response of the signals to a single change of the refractive index is typically insufficient to provide a desired manipulation of the signals, such as combining or splitting the signals of different wavelength. However, a number of refractive index steps can collectively achieve the desired effect. Accordingly, in various embodiments, the MMI device includes a non-uniform pattern of patches forming a non-uniform refractive index distribution within the MMI device.

Figure 2:
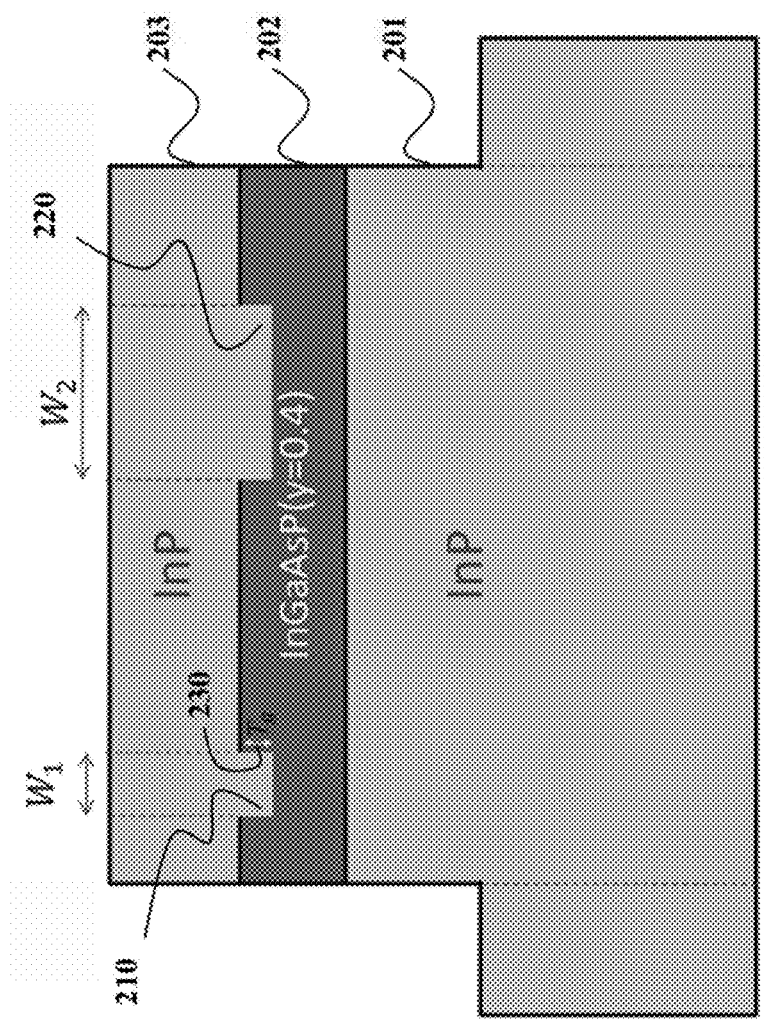
FIG. 2 is a cross section of the MMI device including non-uniform pattern of patches according to one embodiment of the invention.

FIG. 2 shows a cross section of the MMI device 200 including the non-uniform pattern of patches. In the example, the core layer 202 is $In_{1-x}Ga_xAs_yP_{1-y}$ (=0.4), between the InP substrate 201 and the InP cladding layer 203. The optical signal is concentrated in the core layer having the refractive index higher than refractive index of the cladding layer. The lower refractive index of the cladding layers serves as a support for the propagating optical signal along the depth of the MMI device.

In this embodiment, $In_{1-x}Ga_xAs_yP_{1-y}$ is a quaternary material, where x (from 0 to 1) is a fraction of Ga, and y (from 0 to 1) is a fraction of As. For example, if x=0 and y=0, the quaternary material is InP. Similarly, if x=1 and y=1, then the quaternary material is GaAs.

To deposit the InGaAsP material on the InP layer, a lattice matched condition defines a relationship between x and y, such as x=−0.42 y. By specifying the value of one component, e.g., y=0.4, the full composition of the material can be determined.

The MMI device 200 includes a patch 210 and another patch 220. The patches 210 and 220 arranged in a non-uniform pattern and form a non-uniform refractive index distribution within the MMI device. In this example, each patch has a rectangular shape and extends through the cladding layer into the core layer by a constant thickness Tg 230. Dimensions of the two patches, e.g., widths of the patches $W_1$ and $W_2$ are different. In alternative embodiments, the patches vary in shape, sizes, material and depth.

Figure 3:
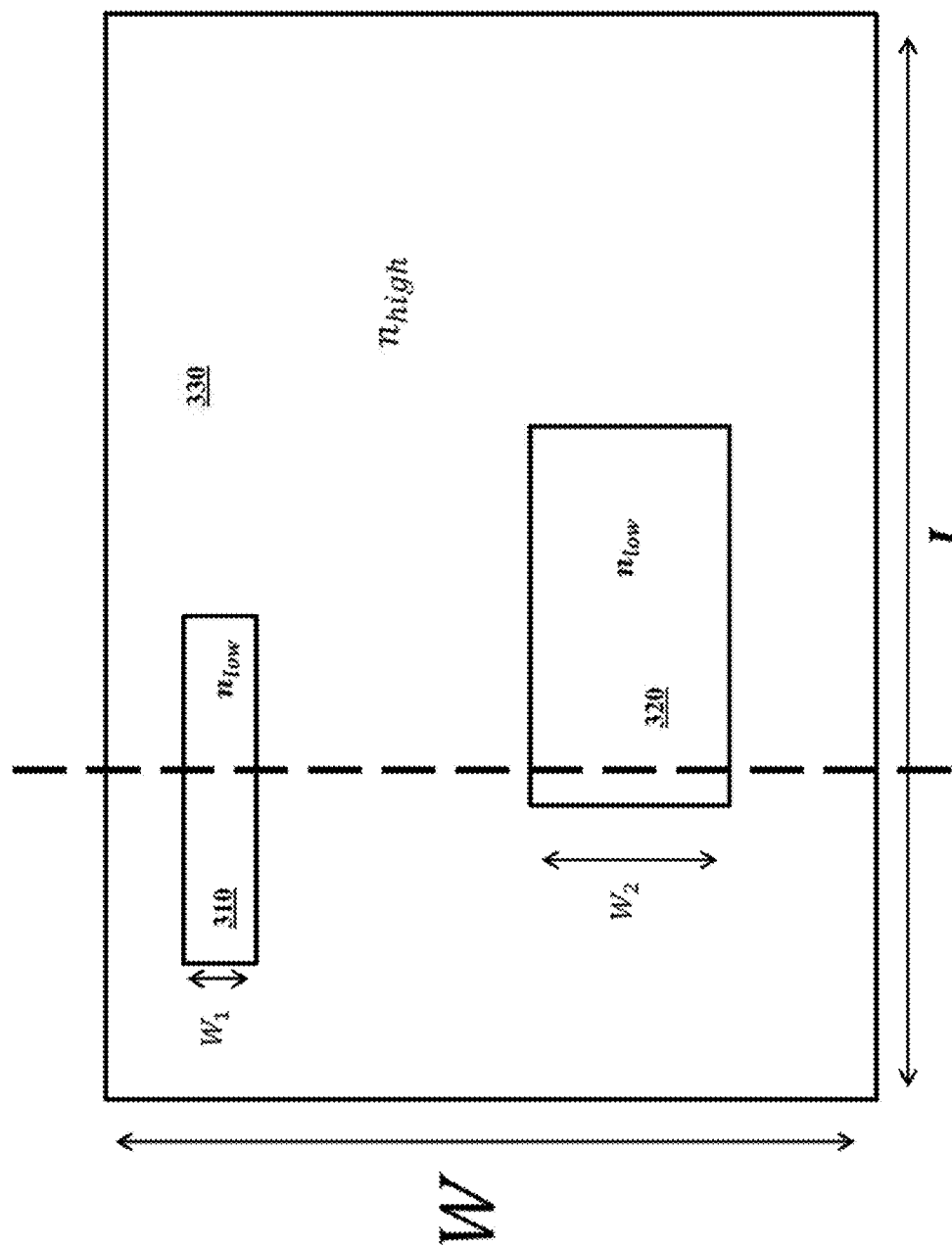
FIG. 3 is a top view of the non-uniform refractive index distribution of the device of FIG. 2.

FIG. 3 shows a top view of the non-uniform refractive index distribution of the device 200. In this embodiment, a refractive index for a region of a patch, e.g., an index $n_{low}$ of a region 310 and 320, is lower than a refractive index for a non-patch region, e.g., an index $n_{high}$ of a region 330. In an alternative embodiment this relationship can be reversed. Also, in one embodiment, the materials of the patches include a metallic material, which causes an imaginary part of the refractive index to produce a predetermined functionality of polarization.

Some embodiments use optimization method to determine the non-uniform pattern of patches resulting in desired wavelength selectivity in a short device. However, optimization parameters can be difficult to select, because the underlying theory of wavelength manipulation using the non-uniform refractive index distribution is still developing. Accordingly, some embodiments determine a set of parameters of the patches randomizing the distribution of the refractive index and optimize the parameters according to a predetermined task.

For example, one embodiment uses covariance matrix adaptation evolutionary strategy (CMA-ES) for the optimization. The CMA-ES optimization requires only a single input a-priori, thus is advantageous for self-adaptation.

Optimization of Non-Uniform Pattern

Figure 4A:
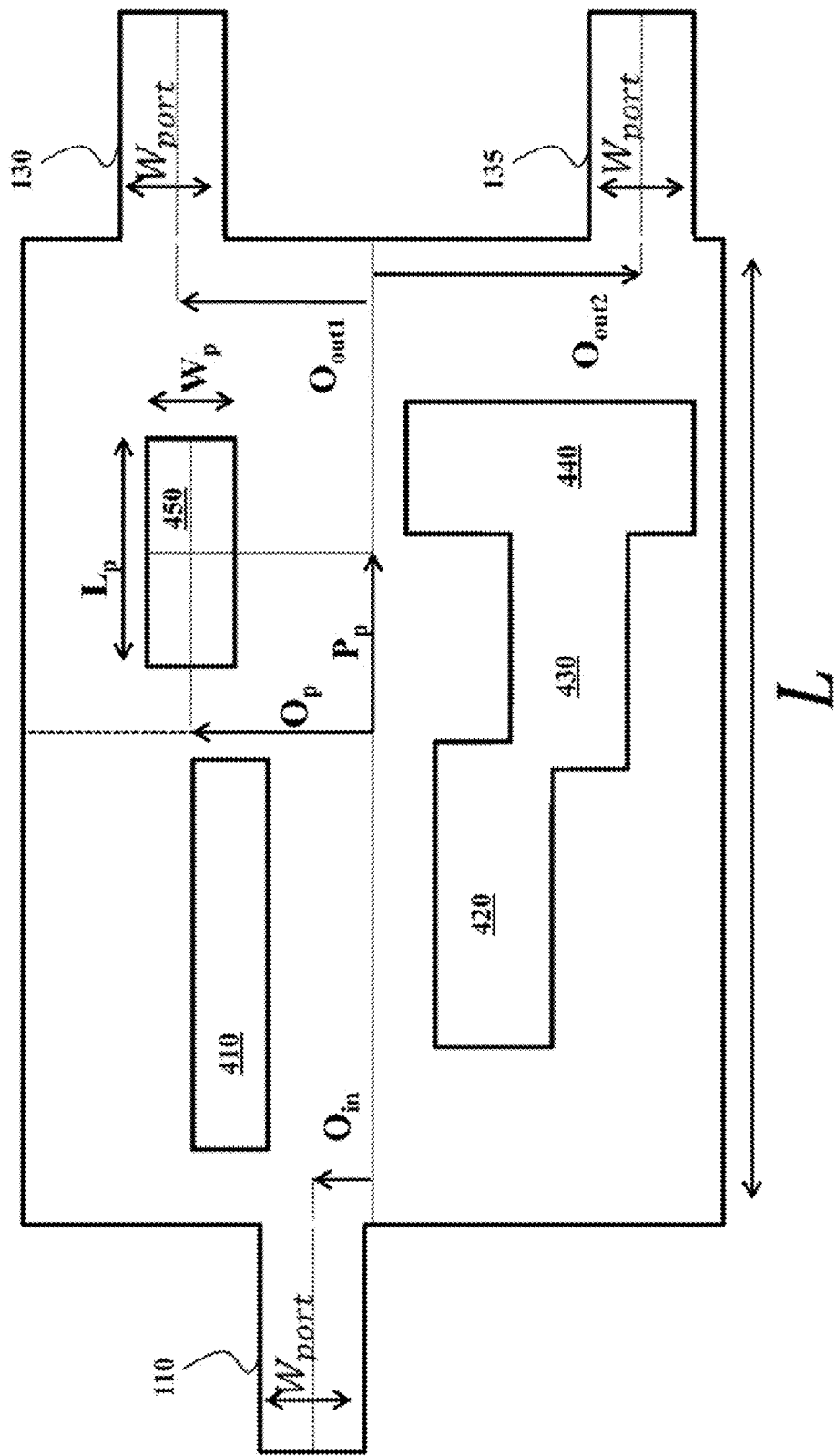
FIG. 4A and FIG. 4B are top views of the device of FIG. 1 according to various embodiments of the invention.

FIG. 4A shows a top view of the device 100 of FIG. 1 having non-uniform refractive index distribution determined using optimization method according to one embodiment of the invention. According to the optimization method, the lateral width W of the MMI device and the length L of the device are variable parameters under certain constraints during the optimization. The refractive index distribution is randomized by employing a predetermined number of rectangular patches. In this example, the method uses five patches. Each patch identified by four parameters, i.e., a lateral width $W_p$ of the patch, an offset $O_p$ of the patch, a position $P_p$ of the patch and a length $L_p$ of the patch. The position of input waveguide 110 and output waveguides 130 and 135 are identified by lateral axis offsets $O_{in}$, $O_{out1}$ and $O_{out2}$. The width $W_{port}$ of all three waveguides are identical or variables optionally.

FIG. 4 shows the five patches forming the non-uniform pattern. The set of parameters for a patch is assigned with low and high constraints in such a way that the patches can overlap, and reside at least partially inside the MMI device. In this example, the total number of variables in the above optimization problem is at least $N_{var}=4\times N_p+5$, where $N_p$ is the number of initial patches.

In contrast to a uniform pattern, the patches in a non-uniform pattern are not evenly spaced. For example, the patches 410, 420, 430, 440, and 450 have a different, e.g., random order, orientation, and the distance between each other. For example, the patches 420 and 430 intersect with each other, the patches 430 and 440 are bordering each other, and the patches 410 and 450 are located at a distance from each other. Such non-uniformity is formed, at least in part, by an optimization method employed by some embodiments of the invention.

Figure 4B:
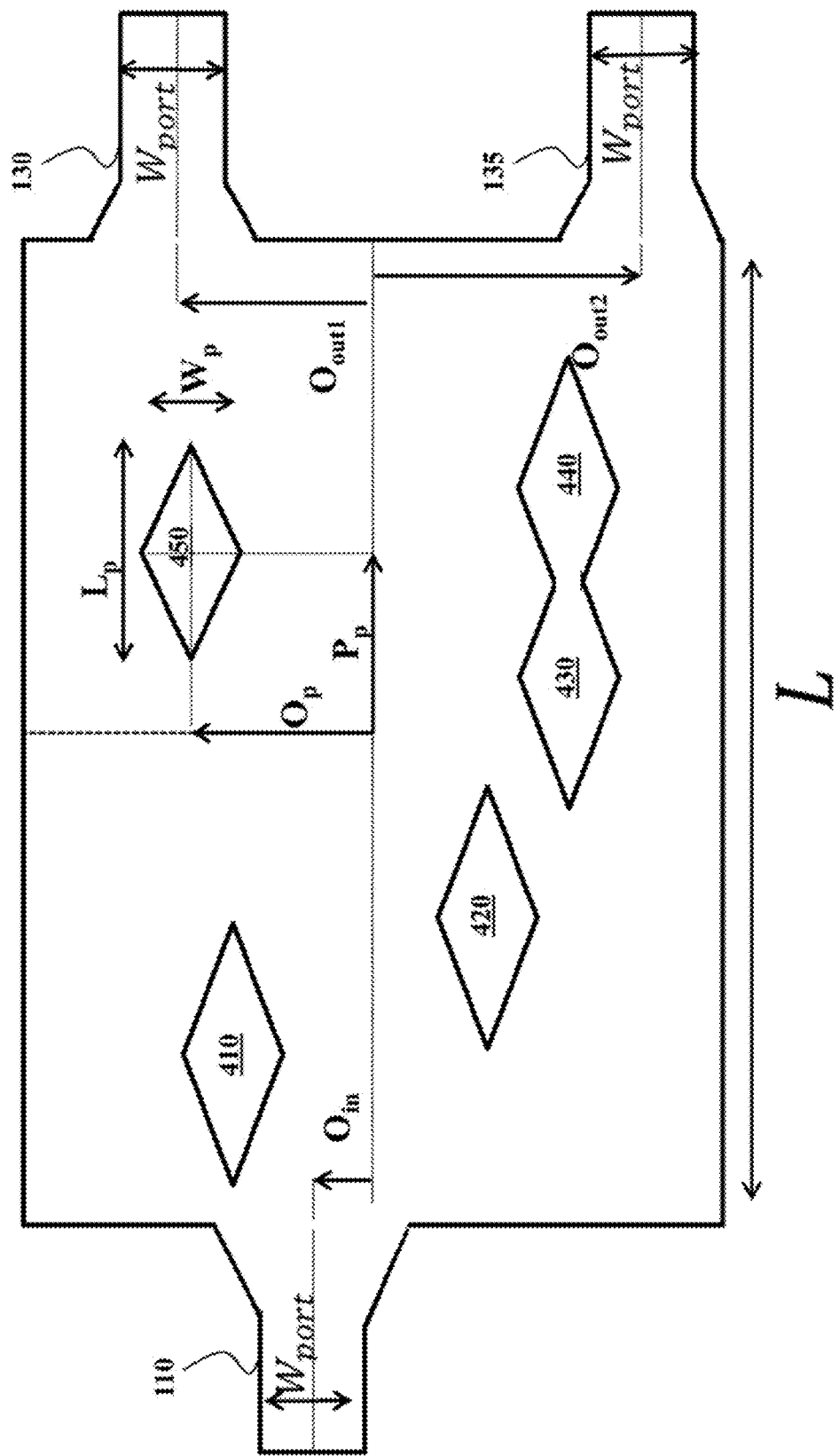

FIG. 4B shows a top view of the device 100 of FIG. 1 according to another embodiment of the invention. This embodiment is based on a realization that reflection from within the device back to the input port causes instability and enhanced noise from the laser device and needs to be minimized. In this embodiment, patches and walls of MMI input/output ports are slanted such that reflection back to the input port is minimized.

Figure 5:
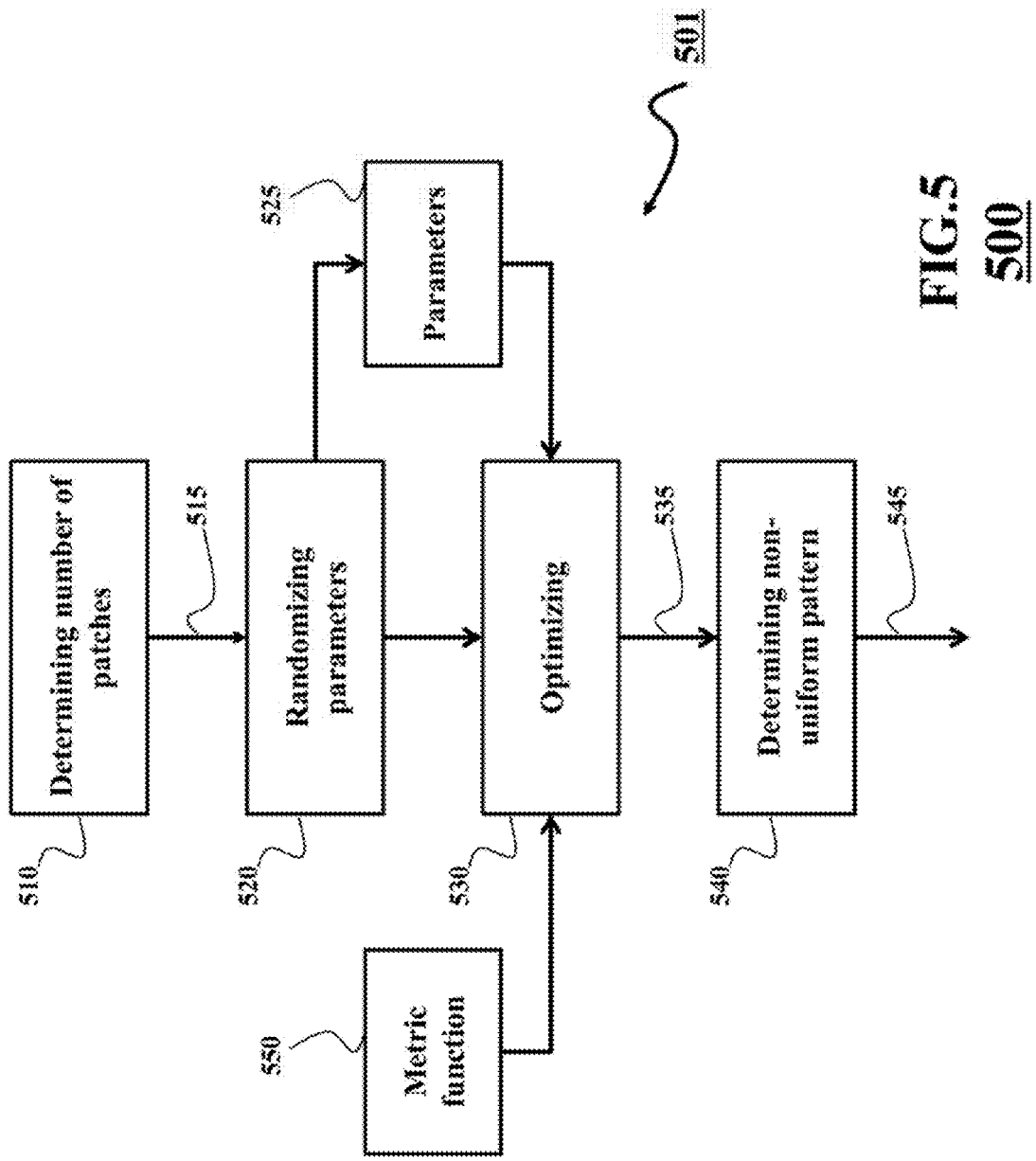
FIG. 5 is a block diagram of a method for determining a non-uniform pattern of patches according to one embodiment of the invention.

FIG. 5 shows a block diagram of a method 500 of one embodiment for determining a non-uniform pattern of patches forming a non-uniform refractive index distribution within the MMI device, such that the non-uniform pattern of patches manipulates the optical signal according to the predetermined task. The method can be implemented using a processor 501.

The method determines a random set 525 of parameters of the non-uniform pattern of patches. For example, the method determines 510 a number 515 of patches and determines 520 randomly values of parameters for each patch. Next, a metric function 550 of the parameters defining an operation of the MMI device performing the predetermined task is optimized 530 to produce an optimal set of parameters 535. The non-uniform pattern 545 of patches is determined 540 using the optimal set of parameters 535.

For example, the embodiment employing the CMA-ES method searches for the global optimum in the function space based on several particles. The history of function evaluation distributed on evolving hyper ellipse determines the direction of the method in the next iteration. The number of particles $N_{part}$ is dependent on the problem. In one embodiment the number of particles is $$N_{part}=4+\lfloor 3\times \ln N_{var}\rfloor. \quad (3)$$

Another aspect of the optimization process is a metric function, i.e. the value returned by each particle at each iteration that is used to evaluate the optimizer behavior at a given iteration. The wavelength combiner/splitter is designed for a predetermined task, e.g., to couple the beam at wavelength $\lambda_1$ and $\lambda_2$ to respective output ports, while suppressing crosstalk. Therefore the metric function is selected accordingly, e.g., to define an operation of the MMI device performing the predetermined task. Among several metric functions used by various embodiments, one metric function maximizes the average convergence of CMA-ES. This metric function is $$\text{Metric} = \log[P_1^{\lambda_1}] + \log[P_2^{\lambda_2}] - \log[P_1^{\lambda_2}+1] - \log[P_2^{\lambda_1}+1], \quad (4)$$

where $P_m^{\lambda_n}$ is the $m^{th}$ mode power at $m^{th}$ output waveguide, at wavelength $\lambda_n$, n=1, 2, m=1, 2. Some embodiments use fractional power normalized with respect to the power of the fundamental transverse electro-magnetic (TE) mode that exists in the input waveguide and couples to the MMI device, according to $$P_m^{\lambda_n} = \frac{\int_{-W/2}^{W/2} u_{out,m}^{\lambda_n}(x)\cdot\left(u_{in}^{\lambda_n}(x)\right)^* dx}{\int_{-W/2}^{W/2} |u_{out,m}^{\lambda_n}(x)|^2 dx}, \quad (5)$$

n=1, 2, m=1, 2. $u_{in}^{\lambda_n}$, $u_{out,1}^{\lambda_n}$ and $u_{out,2}^{\lambda_n}$ are the fundamental TE modes that exist in the input waveguide, first output waveguide and second output waveguide, respectively and at wavelength $\lambda_n$. The maximum possible value of the metric function in (4) is 0, and occurs in the ideal case of no crosstalk at both wavelengths.

Fabrication of Non-Uniform Pattern

After the non-uniform pattern of patches forming a non-uniform refractive index distribution within the MMI device is determined, the MMI device having the non-uniform pattern of patches is fabricated.

Figure 6:
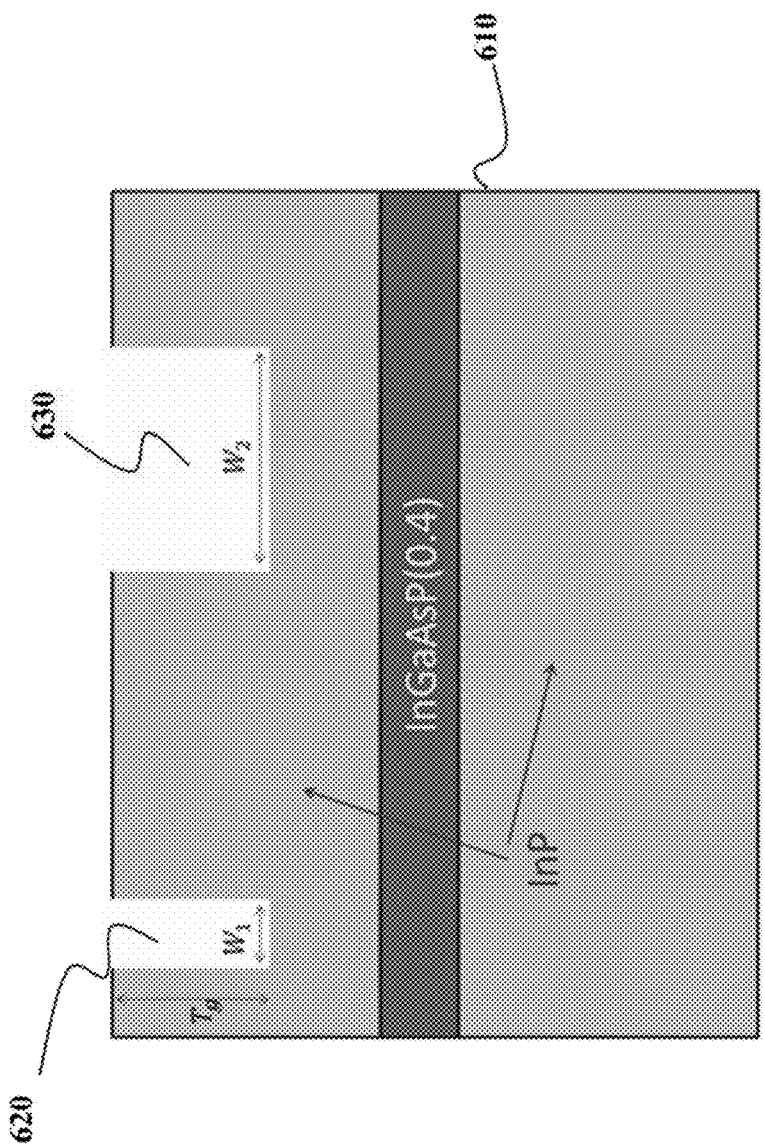
FIG. 6 is a cross section of MMI device according to one embodiment of the invention.

FIG. 6 shows the MMI device 610 fabricated according to one embodiment of the invention. The embodiment etches into the upper cladding layer or into the core layer with air or a dielectric material, e.g., silicon dioxide such as SiNx and SiO2, forming patches 620 and 630. This embodiment is easier to implement, but the precise formation of the pattern is difficult to control. Specifically, this embodiment requires controlling the stop of the etching, which can create manufacturing issue.

Figure 7:
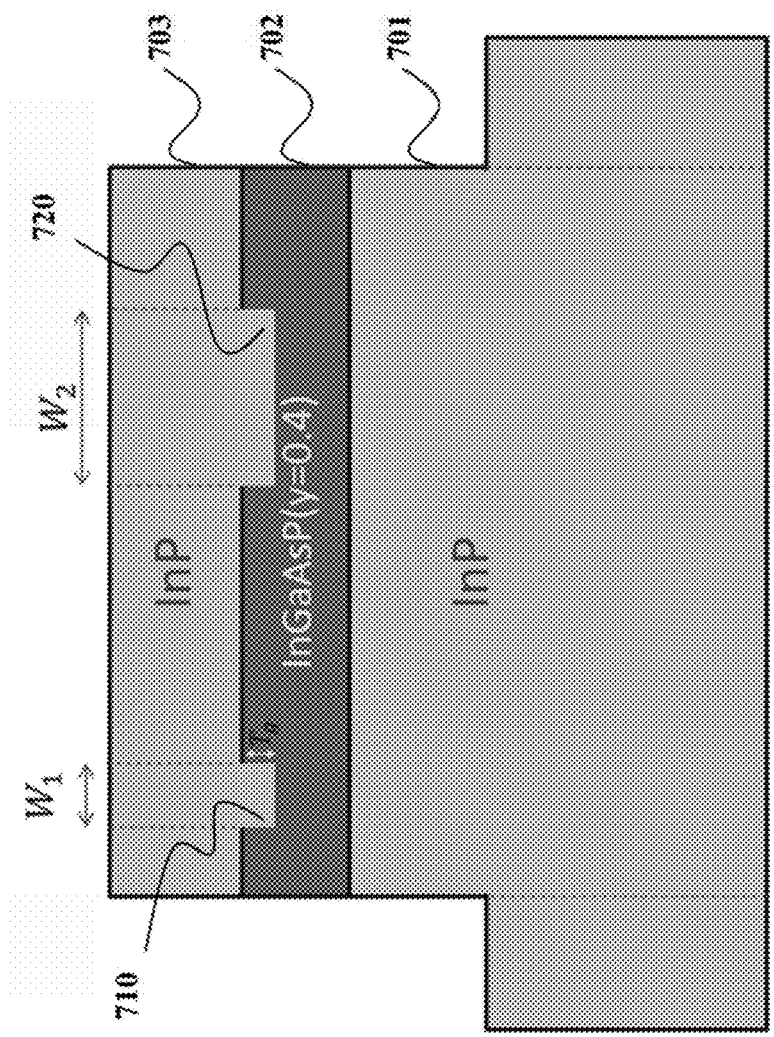
FIG. 7 is a cross section of MMI device according to another embodiment of the invention.

FIG. 7 shows the MMI device 700 fabricated according to another embodiment. The fabrication includes depositing, e.g., growing, a core layer of the MMI device 702 on a substrate 701, etching the core layer according to the non-uniform pattern of patches to form a non-uniform pattern of etches 710 and 720, and depositing a cladding layer 703 filling the non-uniform pattern of etches. The fabricating process of this embodiment is easier to control.

The effective refractive index of the waveguide depends on the etching depth. The etching is a process of removing unwanted materials. Examples of the etching include wet etching and dry etching. Wet etching, also known as chemical milling, is the process of using acids, bases or other chemicals to dissolve unwanted materials such as metals, semiconductor materials or glass. Dry etching refers to the removal of material by exposing the material to a bombardment of ions that dislodge portions of the material from the exposed surface. For any type of the etching process, control of the etching depth can be difficult, and variation of the etching depth can contribute to performance variations among manufactured devices.

Figure 8:
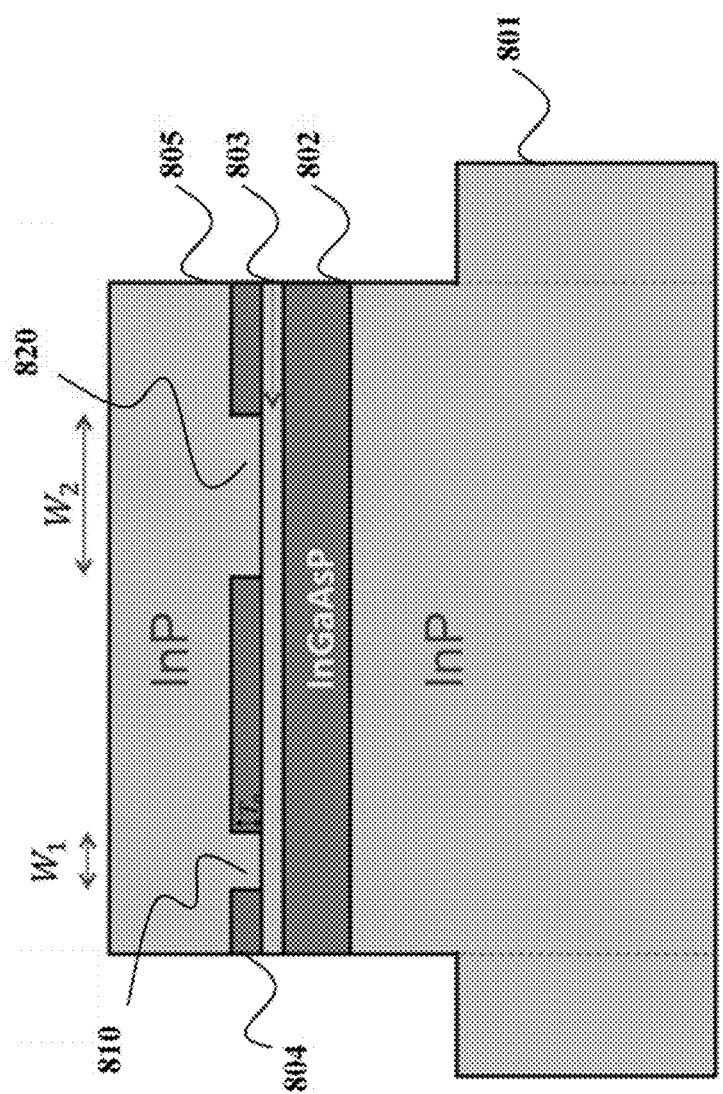
FIG. 8 is a cross section of MMI device according to yet another embodiment of the invention.

FIG. 8 shows the MMI device 800 fabricated according to yet another embodiment. The fabrication includes growing the first core layer 802 of the MMI device 800 on a substrate 801, growing the first cladding layer 803 of the MMI device on the first core layer, and growing the second core layer 804 of the MMI device grown on the first cladding layer. Etching the second core layer according to the non-uniform pattern of patches to form a non-uniform pattern of etches 810 and 820. Growing a second cladding layer 805 to fill the non-uniform pattern of etches. In this embodiment, the etching is controlled such that the second core layer is completely etched and the first cladding layer is only partially etched. The second cladding layer 805 is of the same material as the first cladding layer 803 and the two cladding layers merge to compensate the differences in etching. That way, variability of the etching rate does not affect the device performance, and the fabrication according to this embodiment minimizes the variation of the etching depth.

Figure 9:
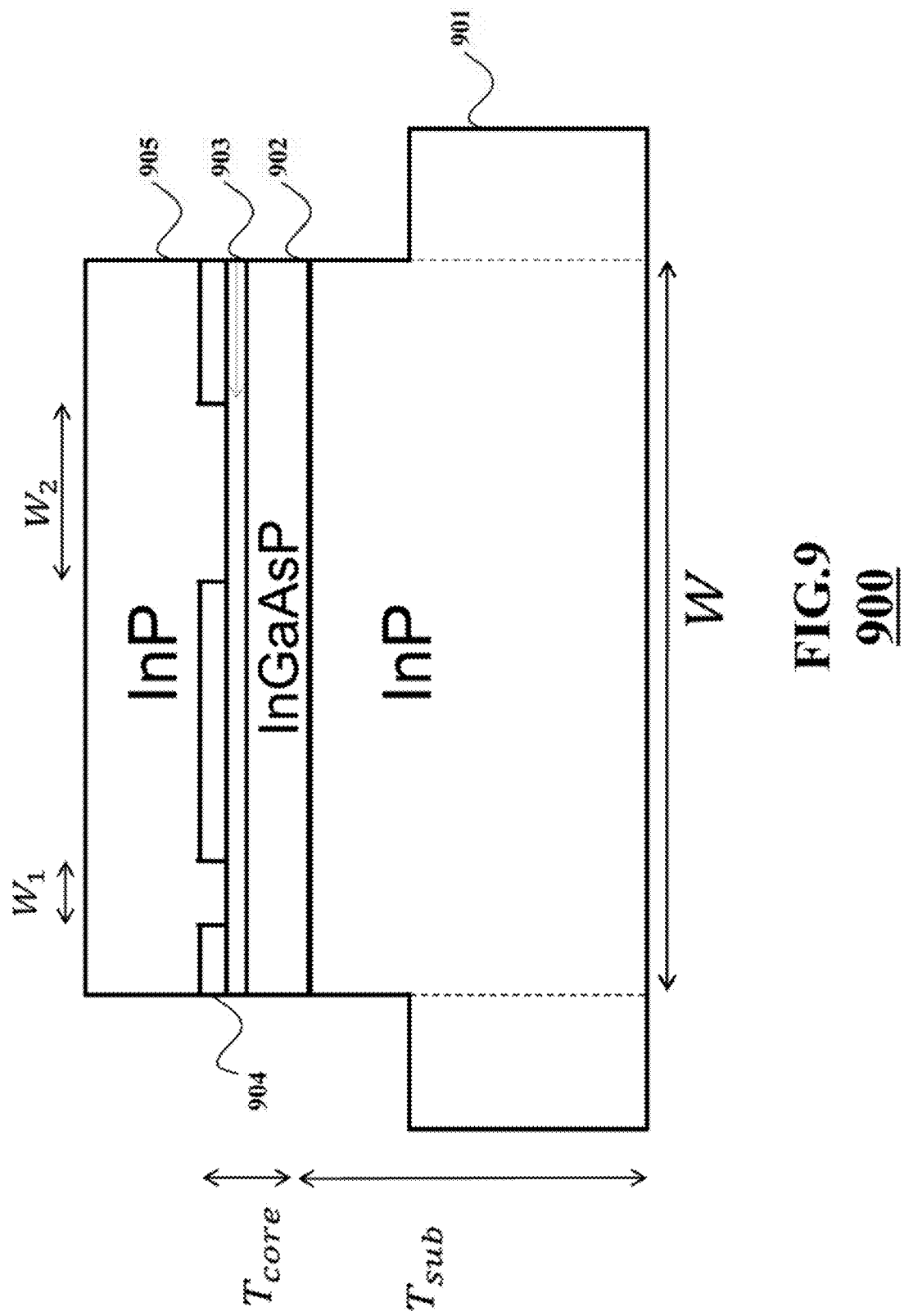
FIG. 9 is a cross section of MMI device according to yet another embodiment of the invention.

FIG. 9 shows the MMI device 900 fabricated according to yet another embodiment. This embodiment uses an etch-stop layer to minimize the fluctuation of etching of different patches. For example, etching rate for InGaAsP material depends on the composition (y) and the etching solution (in the case of wet etching) or the gas (in the case of dry etching). By selecting a specific composition, the InGaAsP layer can act as an etch-stop layer, having a slow etching rate for the material of the layer. In this case, regardless of etching condition variations, the stop-etching layer slows the etching and reduces variation of the etching depth.

The fabrication includes growing the first core layer 902 of the MMI device 900 on a substrate 901; growing an etch-stop layer 903 of the MMI device on the first core layer; growing the second core layer 904 of the MMI device on the etch-stop layer; etching the second core layer according to the non-uniform pattern of patches to form a non-uniform pattern of etches; and growing a cladding layer 905 filling the non-uniform pattern of etches. The fabrication according to this embodiment minimizes the variation of the etching depth.

Patches with Non-Uniform Shape

Some embodiments of the invention are based on another realization that in addition or instead of using a non-uniform pattern of patches, a reduced number of patches with non-uniform shapes can be used to provide a non-uniform refractive index distribution in the MMI device. As used herein, the non-uniform shape of the patches is formed by a combination of different types of geometric primitives. For example, the non-uniform shape can be formed by an intersection of a plurality of curves including at least one curve with a non-null curvature. In different embodiments, the intersecting curves can have different curvatures and/or types. Generally, the plurality of curves includes a pair of curves intersecting at non-straight angle. In some cases, the non-uniform shapes can simplify the fabrication of the MMI device, and/or further reduce its length.

Figure 10:
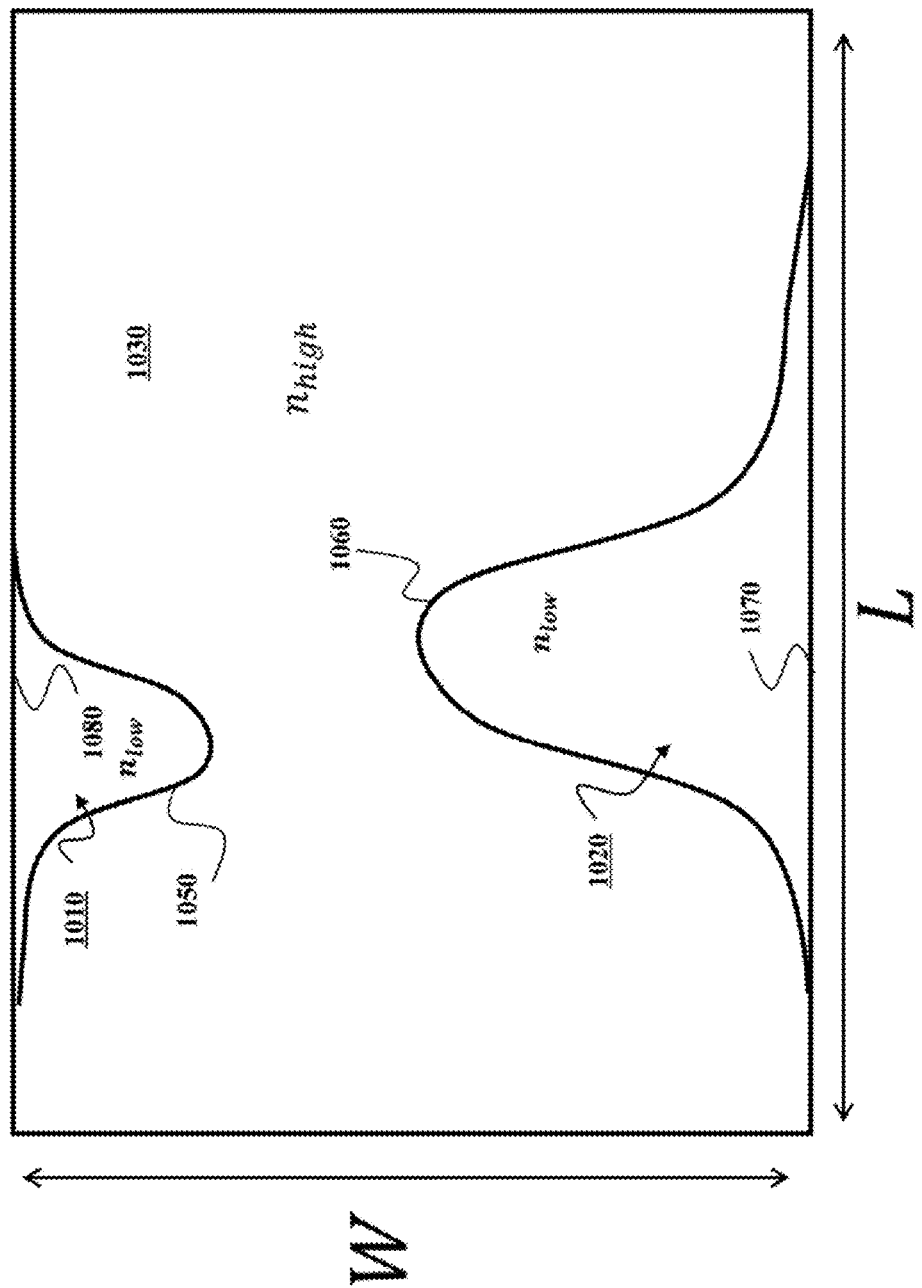
FIGS. 10, 11 and 12 are top views of the device including patches of non-uniform shapes according to different embodiments of the invention.

FIG. 10 shows a top view of the non-uniform refractive index distribution of the device formed by patches of non-uniform shapes. In this embodiment, a refractive index $n_{low}$ for regions of patches 1010 and 1020 is lower than a refractive index $n_{high}$ for a non-patch region 1030. In an alternative embodiment, this relationship can be reversed.

The patches 1010 and 1020 have non-uniform shape formed by an intersection of curves with different curvatures. In this embodiment, the patch 1010 is formed by a curve 1060 with non-null curvature and a straight segment 1070, i.e., a curve with a null curvature. Similarly, the patch 1010 is formed by a curve 1050 and a straight segment 1080. Combinations of other types and numbers of the curves are possible.

Figure 11:
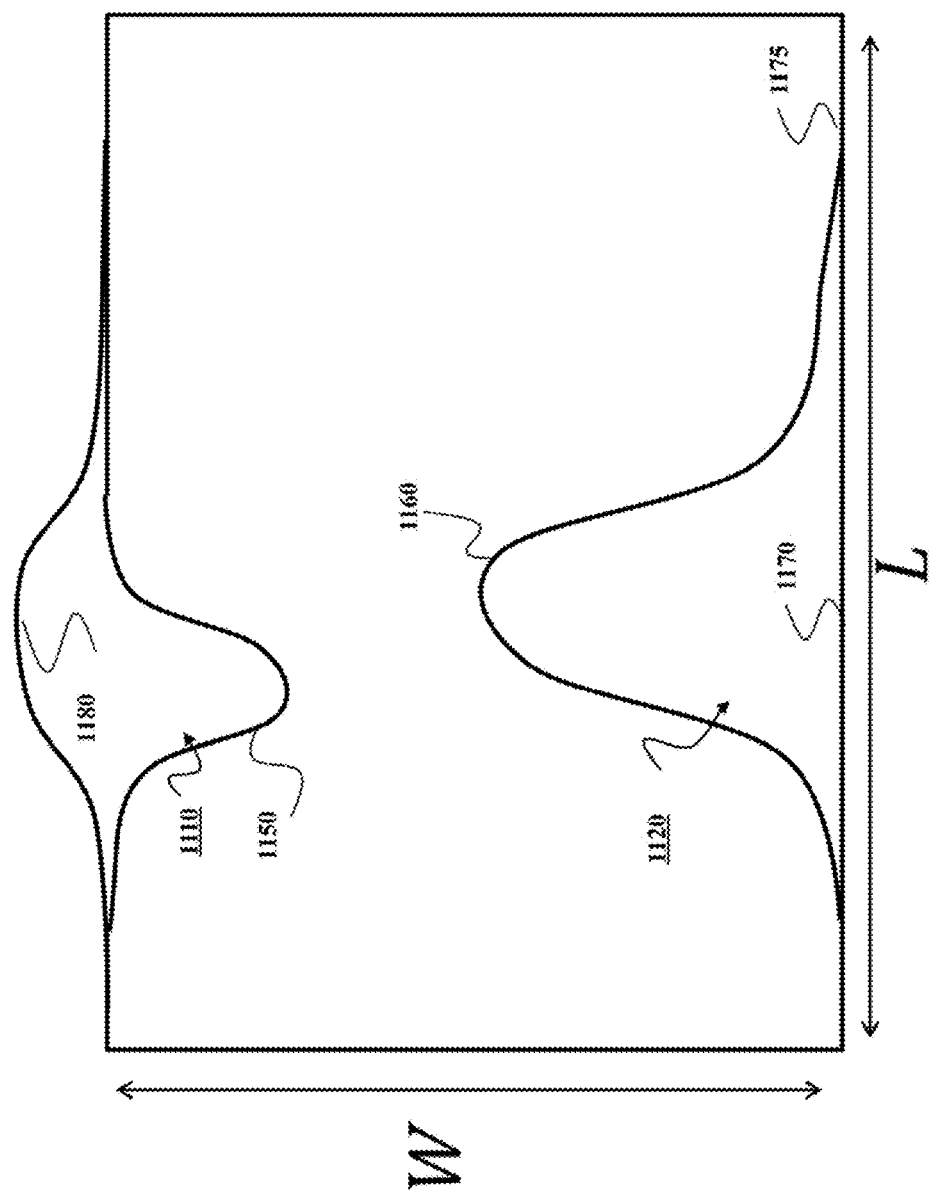

FIG. 11 shows a top view of the non-uniform refractive index distribution of the device formed by patches 1110 and 1120 of non-uniform shape. In some embodiments, a curve from the plurality of curves coincides with a sidewall of the MMI device. In some situations, such arrangement simplifies the fabrication of the MMI device and can further improve the creation of the non-uniform refractive index distribution.

For example, the shape of the patch 1120 is formed by intersecting curves 1160 and 1170, and the null curvature curve 1170 coincide with, i.e., form a part of, a sidewall 1175 of the MMI device. Similarly, the shape of the patch 1110 is formed by intersecting two curves 1150 and 1180 with non-null curvatures. In this example, the non-null curvature curve 1180 coincides with a sidewall of the MMI device, making this part of the sidewall curved.

In some implementations, the patches are smoothly curved in shape or piece-wise linear shaped within the MMI. A number of control points and a variant of interpolation methods, which may include spline interpolation, linear interpolation, polynomial interpolation, and Bezier interpolation, can characterize the shape of grooves. Some realizations determine a set of parameters of the patches and tilted joints, randomizing the distribution of the refractive index and optimize the parameters according to a predetermined task. As an example, one realization uses the CMA-ES for the optimization.

Figure 12:
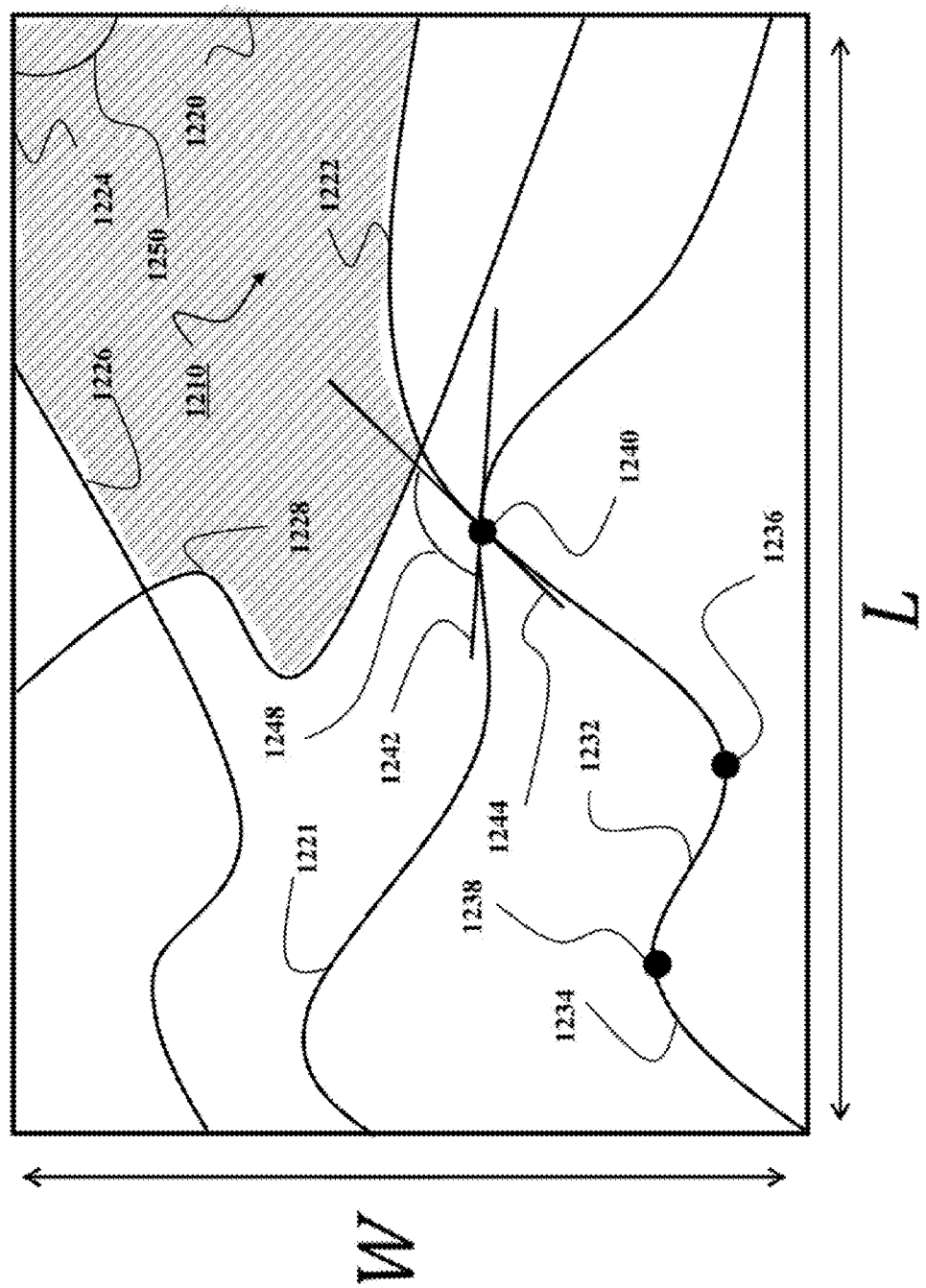

FIG. 12 shows a top view of the non-uniform patches of the MMI device according another embodiment of the invention. In this embodiment, the plurality of curves includes multiple splines, e.g., 1221, 1222, 1226, and 1228. A spline is a sufficiently smooth polynomial function that is piecewise-defined, and possesses a high degree of smoothness at, e.g., points 1238 and 1236 also known as knots, where the polynomial pieces, e.g., the arcs 1234 and 1232 connect. In some embodiments, the spline includes at least two polynomial sections with different curvatures.

This embodiment of the invention is based on realization that etching a spline shape of the patch can provide an advantageous balance between a complexity of manufacturing a non-uniform shape of the patch and a distribution of the change in the refraction index in various parts of the MMI device. For example, etching a spline across the MMI device changes the refraction index non-uniformly based on a shape of the spline. Thus, the shape of the multiple splines can be selected and/or optimized for a specific task.

In FIG. 12, a shape of a patch 1210 is formed by an intersection of splines 122, 1226, and 1228 and curves 1220 and 1224. Generally, the plurality of curves are intersected includes a pair of curves intersecting at non-straight angle. For example, the curves 1224 and 1220 intersect at a right angle, but angles can be also acute or obtuse.

The angle of intersection of the curves with non-null curvature can be determined by an angle of tangents to the curves at the point of their intersection. For example, the angle of intersection of the curves 1221 and 1222 can be determined by an angle 1248 formed by tangents 1242 and 1244 to the curves 1221 and 1222 at the point of intersection 1240.

Alternative embodiments form a non-uniform refractive index distribution within the MMI device by using different kinds of non-uniform shapes. For example, in some embodiments, at least two edges of at least one patch in the non-uniform pattern formed by the same geometric primitives of different dimension. An example of such a shape is a triangle having different lengths sides. Another embodiment varies shapes and dimensions among different patches. One embodiment uses curved-shape sidewalls of MMI structure as a taper, which creates non-uniform mode interference patterns over the propagation.

Although the invention has been described by way of examples of preferred embodiments, it is to be understood that various other adaptations and modifications may be made within the spirit and scope of the invention. Therefore, it is the object of the appended claims to cover all such variations and modifications as come within the true spirit and scope of the invention.

We claim:

1. A multi-mode interference (MMI) device, comprising:
a substrate layer;
a core layer arranged on the substrate layer for propagating an optical signal; and
a cladding layer arranged on the core layer for guiding the optical signal, wherein the MMI device includes a patch with a non-uniform shape formed by an intersection of a plurality of curves forming a non-uniform refractive index distribution within the MMI device, wherein the plurality of curves includes at least one curve with a non-null curvature, and wherein the plurality of curves includes at least one spline.

2. The MMI device of claim 1, wherein the plurality of curves includes at least two curves with different curvatures.

3. The MMI device of claim 2, wherein the plurality of curves includes at least one curve with a null curvature.

4. The MMI device of claim 1, wherein the spline includes at least two polynomial sections with different curvatures.

5. The MMI device of claim 1, wherein the plurality of curves include multiple splines.

6. The MMI device of claim 1, wherein the plurality of curves includes a pair of curves intersecting at non-straight angle.

7. The MMI device of claim 1, wherein the pair of curves intersects at a point of an intersection with a right or an acute angle formed by tangents to the pair of curves at the point of the intersection.

8. The MMI device of claim 1, wherein a curve from the plurality of curves coincides with a sidewall of the MMI device.

9. The MMI device of claim 8, wherein the curve has a non-null curvature forming a curved sidewall of the MMI device.

10. The MMI device of claim 1, wherein the MMI device includes a non-uniform pattern of patches etched through the cladding layer into the core layer by a constant thickness, and wherein dimensions of at least two patches in the non-uniform pattern are different.

11. The MMI device of claim 10, wherein at least two patches in the non-uniform pattern overlap with each other.

12. The MMI device of claim 10, wherein at least two patches in the non-uniform pattern varies in shape or material.

13. The MMI device of claim 10, wherein edges of at least one patch in the non-uniform pattern are slanted with respect to an input plane of the MMI.

14. A method for manipulating an optical signal according to a predetermined task by a multi-mode interference (MMI) device, comprising:
determining a non-uniform pattern of patches forming a non-uniform refractive index distribution within the MMI device, such that the non-uniform pattern of patches manipulates the optical signal according to the predetermined task, wherein the non-uniform pattern of patches includes a patch with a non-uniform shape formed by intersection of a plurality of curves, wherein at least two curves in the plurality of curves have different curvatures, and wherein the plurality of curves includes at least one spline; and
fabricating the MMI device having the non-uniform pattern of patches.

15. The method of claim 14, wherein the two curves include one curve with a null curvature and one curve with a non-null curvature.

16. The method of claim 15, wherein the fabricating comprises:
etching the patch in a core layer of the MMI device such that the null curvature curve or the non-null curvature curve of the patch coincides with a sidewall of the MMI device.

17. The method of claim 14, wherein the fabricating comprises:
depositing a core layer of the MMI device;
etching the core layer according to the non-uniform pattern of patches to form a non-uniform pattern of etches; and
depositing a cladding layer filling the non-uniform pattern of etches.

18. The method of claim 14, wherein the fabricating comprises:
growing a first core layer of the MMI device;
growing a first cladding layer of the MMI device grown on the first core layer;
growing a second core layer of the MMI device grown on the first cladding layer;
etching the second core layer according to the non-uniform pattern of patches to form a non-uniform pattern of etches; and
growing a second cladding layer filling the non-uniform pattern of etches.

19. The method of claim 14, wherein the fabricating comprises:
growing a first core layer of the MMI device;
growing an etch-stop layer of the MMI device;
growing a second core layer of the MMI device deposit on the etch-stop layer;
etching the second core layer according to the non-uniform pattern of patches to form a non-uniform pattern of etches, wherein an etching rate of the etch-stop layer is slower than the etching rate of the second core layer; and
growing a cladding layer filling the non-uniform pattern of etches.

* * * * *